US007698027B2

(12) United States Patent
Caillaud

(10) Patent No.: US 7,698,027 B2

(45) Date of Patent: Apr. 13, 2010

(54) AIRCRAFT PATH VERIFICATION ASSISTANCE METHOD

(75) Inventor: Christophe Caillaud, Blagnac (FR)

(73) Assignee: Thales (FR)

( * ) Notice: Subject to any disclaimer, the term of this patent is extended or adjusted under 35 U.S.C. 154(b) by 737 days.

(21) Appl. No.: 11/596,126

(22) PCT Filed: Apr. 26, 2005

(86) PCT No.: PCT/EP2005/051855

§ 371 (c)(1),
(2), (4) Date: Nov. 9, 2006

(87) PCT Pub. No.: WO2005/109374

PCT Pub. Date: Nov. 17, 2005

(65) Prior Publication Data

US 2007/0233331 A1 Oct. 4, 2007

(30) Foreign Application Priority Data

May 11, 2004 (FR) .................................. 04 05085

(51) Int. Cl.
*G08G 5/04* (2006.01)
*G05D 1/02* (2006.01)
*G01C 23/00* (2006.01)

(52) U.S. Cl. ........................... 701/14; 701/10; 701/301; 340/997

(58) Field of Classification Search ................... 701/14, 701/10, 13, 206, 301; 340/997, 961, 973, 340/963
See application file for complete search history.

(56) References Cited

U.S. PATENT DOCUMENTS 5,337,982 A * 8/1994 Sherry ........................ 244/186
6,112,141 A * 8/2000 Briffe et al. .................... 701/14
6,282,466 B1 * 8/2001 Nolte et al. .................... 701/11
6,922,631 B1 * 7/2005 Dwyer et al. ............... 701/206
7,280,896 B2 * 10/2007 Morizet et al. ................. 701/3
7,493,196 B2 2/2009 Caillaud et al.
7,499,771 B2 3/2009 Caillaud
2003/0004619 A1 * 1/2003 Carriker et al. ................ 701/3

(Continued)

FOREIGN PATENT DOCUMENTS

EP 0 565 399 A 10/1993

(Continued)

OTHER PUBLICATIONS

RTCA DO 236B, "Minimum Aviation System Performance Standards: Required Navigation Performance for Area Navigation", Oct. 28, 2008, RTCA—Radio Technical Commission for Aeronautics.

(Continued)

*Primary Examiner*—Tan Q. Nguyen
(74) *Attorney, Agent, or Firm*—Lowe Hauptman Ham & Berner, LLP

(57) ABSTRACT

A method for assisting in verifying the path of an aircraft comprising a step of computing a path by means of a flight management computer, based on lateral constraints originating from a navigation database, characterized in that it comprises a step consisting in assisting the pilot to verify that the computed path complies with the lateral constraints in order to improve safety.

15 Claims, 3 Drawing Sheets

U.S. PATENT DOCUMENTS

| | | | | |
|---|---|---|---|---|
| 2003/0167109 | A1 * | 9/2003 | Clarke et al. | 701/3 |
| 2004/0111192 | A1 * | 6/2004 | Naimer et al. | 701/9 |

FOREIGN PATENT DOCUMENTS

| | | | |
|---|---|---|---|
| EP | 0 565 399 | A1 | 10/1993 |
| EP | 0565399 | | 10/1993 |
| FR | 2 747 492 | | 10/1997 |
| FR | 2 747 492 | A | 10/1997 |
| FR | 2747492 | | 10/1997 |
| FR | 2 803 655 | | 7/2001 |
| FR | 2 803 655 | A | 7/2001 |
| FR | 2803655 | | 7/2001 |

OTHER PUBLICATIONS

Flight Management System (FMS) Instrument Procedures Development, 8260.40BDec. 31, 1998.

* cited by examiner

AIRCRAFT PATH VERIFICATION ASSISTANCE METHOD

RELATED APPLICATIONS

The present Application is based on International Application No. PCT/EP2005/051855, filed on Apr. 26, 2005, which in turn corresponds to France Application No. 04/05085 filed on May 11, 2004, and priority is hereby claimed under 35 USC §119 based on these applications. Each of these applications are hereby incorporated by reference in their entirety into the present application.

FIELD OF THE INVENTION

The invention relates to assistance in the navigation of an aircraft.

BACKGROUND OF THE INVENTION

In a conventional manner, an aircraft is fitted with a flight management computer used by the pilot for example for computing a reference path based on a flight plan.

It should be noted that a flight plan comprises a sequence of segments. Each segment is defined based on maneuvering instructions that the aircraft must comply with to go from one point to another; these instructions are defined thanks to mandatory and/or optional parameters that are also sometimes described as lateral or vertical constraints. These instructions are listed in a navigation database of the computer.

The reference path from the airport of departure to the destination airport is computed based on these segments which include lateral and vertical constraints, based on constraints of altitude, speed and time, and on the context of the aircraft such as the consumption, the weight of the aircraft, the winds, the temperature, the passenger comfort rules (the banking angle, the load factor), etc.

But, for this reference path to be a path that can be flown by the aircraft, certain lateral or vertical constraints are not complied with or not very closely.

The computer tells the crew the vertical constraints that are not complied with. But neither the crew nor the computer verify that the path obtained complies with the lateral constraints.

An important object of the invention is therefore to help to overcome this disadvantage.

SUMMARY OF THE INVENTION

To achieve this objective, the invention proposes a method for assisting in verifying the path of an aircraft comprising a step of computing a path by means of a flight management computer, based on lateral constraints originating from a navigation database, characterized mainly in that it comprises a step consisting in verifying, by means of the flight management computer, that the computed path complies with the lateral constraints in order to improve safety. Specifically, the lateral constraints are decisive in separating aircraft from one another, or from the ground or from an obstacle; they may also be used to keep aircraft outside reserved air control zones (such as a military zone for example).

Preferably, the verification consists in comparing, by means of the flight computer, the lateral constraints with the computed path.

When a constraint is not complied with, the verification consists in automatically informing the crew, via an audible signal and/or by a display on a man-machine interface, of the lateral constraints and of the computed path.

According to one feature of the invention, the information is displayed at the request of the crew.

Thus, when the crew has the information according to which a constraint is not complied with, it deals with it, where necessary in contact with the air traffic controller.

The invention also has as its subject a flight management computer connected to a navigation interface and capable of computing a path based on lateral constraints and of displaying this path on the navigation interface, characterized in that it comprises means of applying the method as previously described.

BRIEF DESCRIPTION OF THE DRAWINGS

Other features and advantages of the invention will appear on reading the following detailed description, given as a non-limiting example and with reference to the appended drawings in which:

FIGS. 2*a*, 2*b*, 2*c*, 2*d* and 2*e* illustrate schematically examples of lateral constraints to be complied with and FIGS. 2*a*', 2*b*' and 2*e*' illustrate schematically examples of lateral constraints that are not complied with.

DETAILED DESCRIPTION OF THE DRAWINGS

Figure 1:
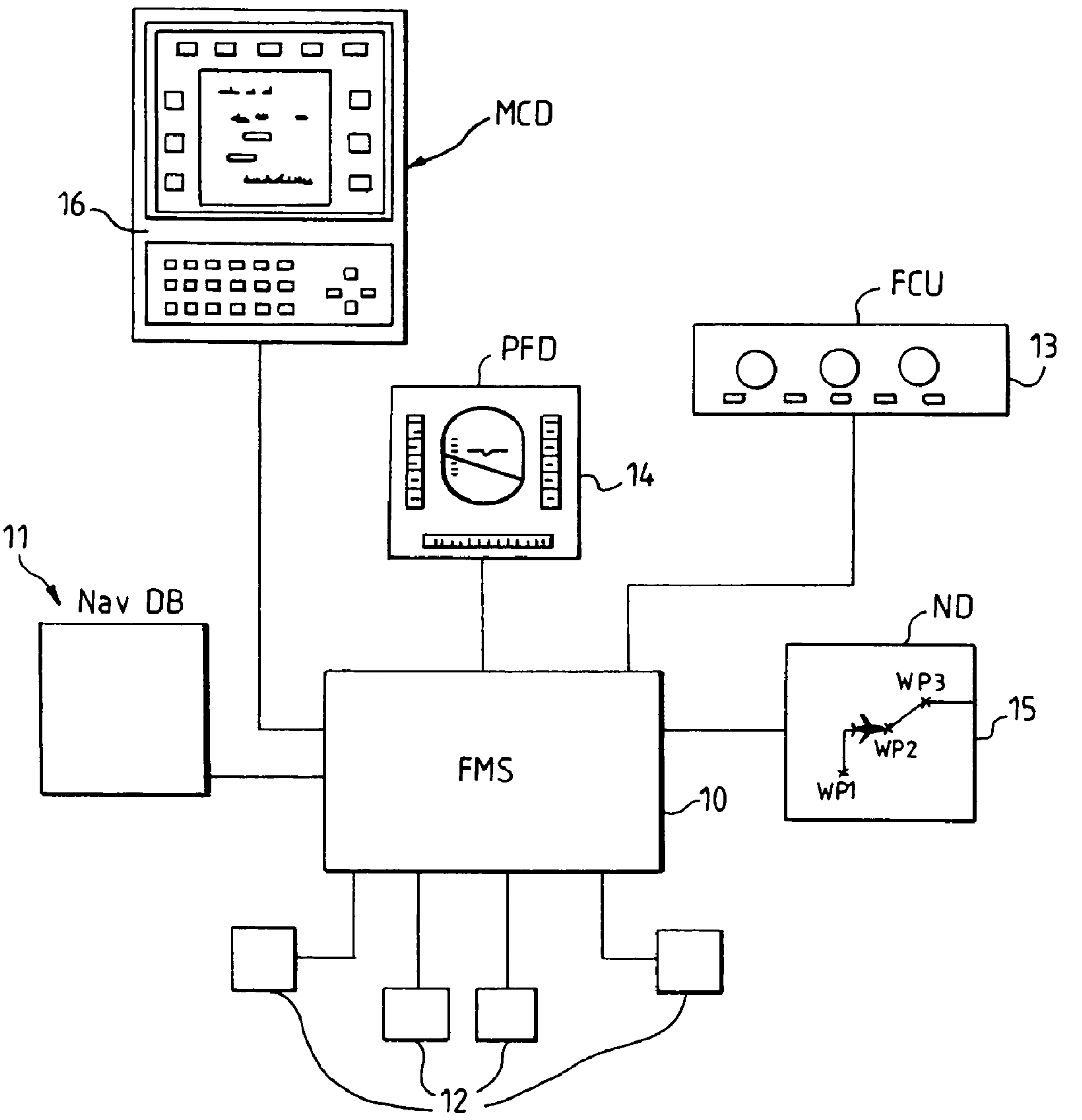
FIG. 1 represents schematically the configuration of a flight management system for an aircraft making it possible to apply the method according to the invention.

It should be noted that an aircraft is fitted with a flight management computer or FMS (Flight Management System). As shown in FIG. 1, the latter exchanges various items of information with the navigation database 11 called the NavDB and with other items of equipment 12 of the aircraft. It communicates with the aircraft crew by means of man-machine interfaces which mainly include:

- an FCU control panel 13 with switches, buttons, displays and lamp indicators making it possible to select and program the various operating modes of the FMS computer 10 and of the automatic pilot and/or flight manager on which the FMS computer 10 acts but that is not shown so as not to unnecessarily overload FIG. 1,
- a PFD primary flight display 14 used for displaying an artificial horizon, and flight parameters such as the altitude of the aircraft, its attitude, its speed vector, an indication of guidance mode, etc,
- an ND navigation display 15 for displaying maps, the flight plan path, etc,
- an MCD console 16 for displaying and entering data having a keyboard and a screen surrounded by function keys, and forming the main instrument of dialog with the FMS computer 10.

The FMS computer 10 assists the crew of an aircraft in programming the flight plan before take-off and in following the flight plan path from take-off to landing. Its assistance in programming the flight plan consists, on the one hand, in tracing in the horizontal and vertical planes a skeleton path formed of a succession of waypoints associated with various flight constraints such as altitude, speed, course or other constraints and, on the other hand, in also tracing in the horizontal and vertical planes the path that the aircraft must follow to complete its mission. During the preparation of the programming of the flight plan, the crew enters into the FMS computer 10, by means of the MCD console 16, in an explicit or implicit manner, the segments, that is to say the geographic coordinates of the waypoints and the flight constraints associated therewith, and obtains from the FMS computer 10 a skeleton path and a flight path, constructed from a sequence of segments connecting the waypoints together in twos from the point of departure to the point of destination and arcs of a circle providing the course transitions between segments at the waypoints; this skeleton path and this path are displayed on the ND navigation display 15 in order to allow the crew to verify their appropriateness.

The onboard NavDB navigation database 11 of the aircraft flight management computer lists the navigation instructions that the aircraft may be required to comply with in its usual maneuvering space. These instructions, which make it possible to define the segments, are usually instructions standardized according to the ARINC 424 standard: the latter defines 23 types of segments (such as DF for "Direct to Fix", FA for "from Fix to Altitude", AF for "Arc to Fix", CF for "Course to Fix", etc) characterized by a maximum of 14 parameters.

A set of instructions forms a procedure.

The crew selects one or more procedures from this database in order to program its flight plan. The computer then extracts the detail of the procedures in order to define the segments—which it may if necessary modify by adding or removing segments directly—and to display on the ND display the skeleton representing the sequence of the segments. It then computes the reference path in order to guide the aircraft to its destination. The reference path is displayed mainly on the ND display.

The MCD console 16 allows the crew to insert the flight plan data into the FMS computer 10, either at the elementary level of the waypoints and the flight constraints associated with the waypoints, or at an intermediate level, that of the navigation procedures that make it possible to enter into the FMS computer 10 valuable tracking data sequences of the portions of the flight plan stored in the NavDB navigation database 11, or else, at the overall level of the flight plan itself making use of the tracking data of a complete flight plan also stored in the NavDB navigation database 11.

Due to the ever increasing computing power of flight management computers, the latter may perform an additional function of checking that the computed path is compatible with the lateral constraints of the flight plan.

The computed path is, for example, the reference path computed before the flight; it may also be a path recomputed during the flight.

The lateral constraints to be complied with relate in particular to:

- flight passenger comfort characterized in particular by the banking angle which must lie between two values such as ±30°,
- the transitions between segments that must be compatible with the applicable standards such as the D0236-EUROCAE ed 75, FAA Order 8260.40 or DO 187 standards,
- the parameters of the path obtained that must be compatible with the parameters of the flight plan segments such as an imposed turn direction, an overflight instruction, an imposed course, keeping distance for curved segments, etc.

The basic constraints of the segments are communicated to the crew: they are preferably displayed in path and/or parameter form, for example on the navigation display ND in addition to the waypoints and the computed path.

Here are some examples of constraints displayed in path form as illustrated in the examples of FIG. 2.

Figure 2A:
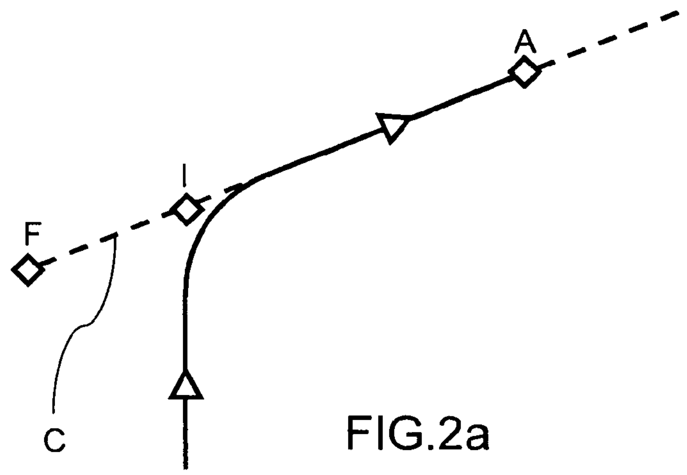

For example, in the case of an interception segment of a segment of the FA ("from Fix to Altitude") type, the parameters that are the reference point F and the course C (in dashed lines), entering into the computation of the segment FA and preceding the interception point I are displayed as illustrated in the example of FIG. 2*a*. The Altitude point of the segment FA is indicated by A. The compliance of the maneuver associated with the segment FA signifies that the path must rejoin the segment after the point F and then follow it in the line up to the defined altitude. FIG. 2*a*' shows an example of a path that does not comply correctly with the segment FA because the path does not follow the line defined by the reference point F and its direction C.

Figure 2B:
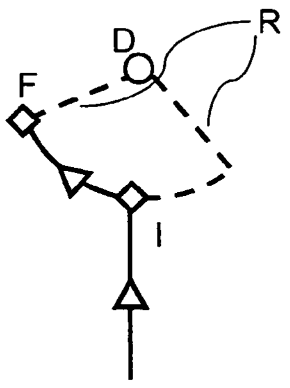

In the case of the interception at I of a segment of the AF (Arc DME to Fix) type, the parameters that are the DME ("Distance Measuring Equipment") beacon and represented by a symbol D, its arc of a circle and its radius R entering into the computation of the segment are displayed as illustrated in FIG. 2*b*. The Fix point of the segment AF is indicated by F. FIG. 2*b*' shows a case in which the path does not correctly capture the arc of a circle of radius R of center D.

Figure 2C:
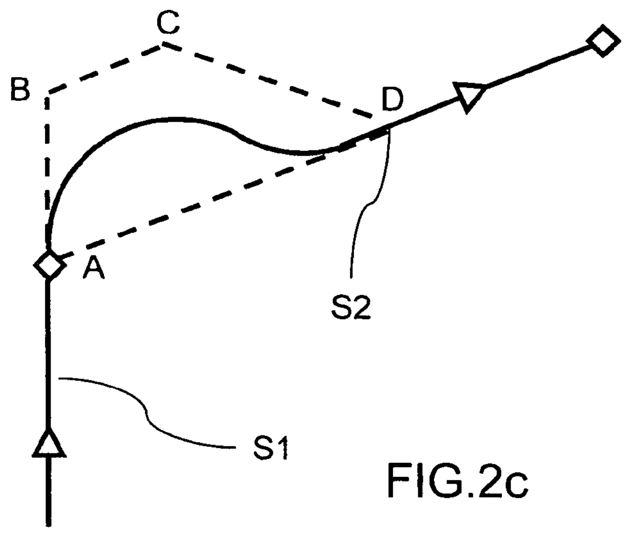

When the overflying of a waypoint A is imposed by the flight plan (either by the procedure or because the pilot has inserted the overfly constraint thanks to the interface), the transition T between the segment S1 and the segment S2 must lie in the zone ABCD computed and displayed as illustrated in FIG. 2*c*.

Figure 2D:
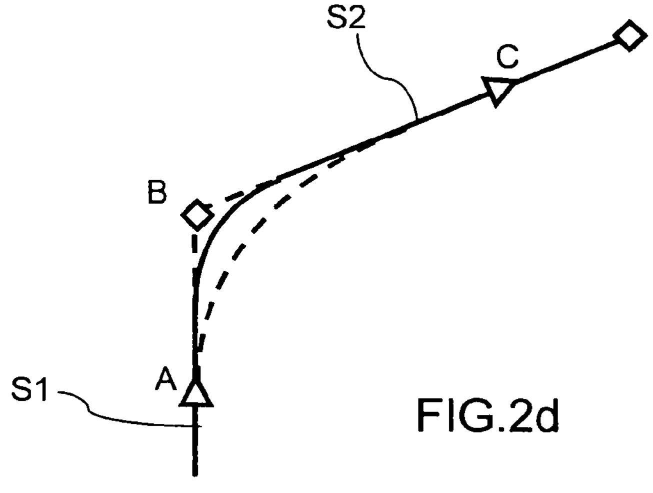

In the case of a transition T having no overfly imposed ("flyby") between segments S1 and S2 according to the D0236-EUROCAE ed 75 standard, the zone ABC in which the transition T must be situated to travel from A to C is computed and displayed as illustrated in FIG. 2*d*.

Figure 2E:
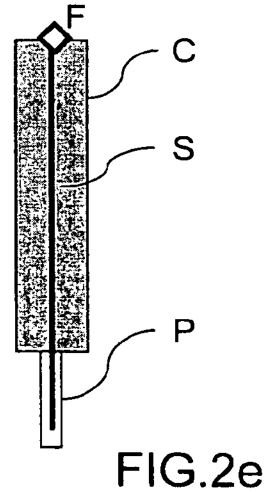
Figure 2A:
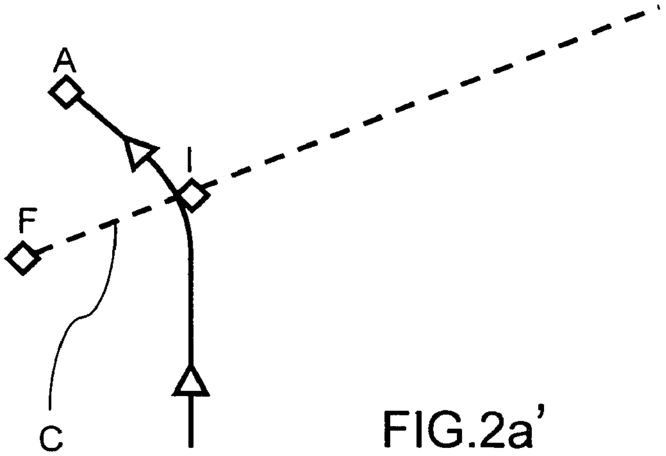
Figure 2B:
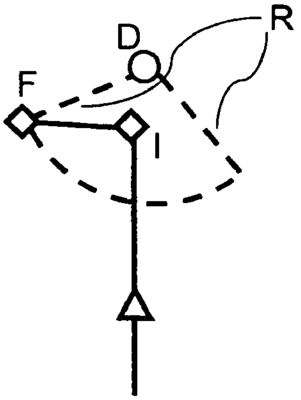
Figure 2E:
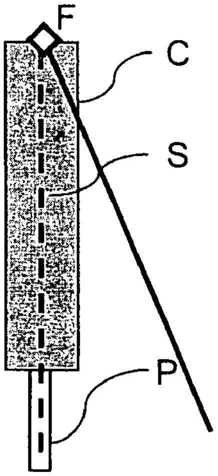

Finally, in the case of a constraint according to the D0236-EUROCAE ed 75 standard concerning the accuracy of navigation that the aircraft must comply with, the corridor C around the reference segment S representing the RNP ("Required Navigation Performance") is displayed as illustrated in the example of FIG. 2*e* in which the segment S begins with a take-off runway P. The RNP may depend on the zone in which the aircraft is maneuvering (typically 0.3 NM on the approach, 1.0 NM in the terminal zone or 4.0 NM in the ocean zone), on the selected procedure, etc. It is recognized that compliance with the RNP by the computed path does not ensure compliance with it on the actual path of the aircraft because other errors may occur during the flight (positioning and coupling for example). An example of noncompliance with the RNP is illustrated in FIG. 2*e*' in which the path is situated outside the RNP zone.

According to a first embodiment, the constraints are displayed by the FMS on the ND navigation interface at the request of the crew which then itself compares the differences.

According to another embodiment, the lateral constraints are displayed on the ND navigation interface according to the context. The FMS first makes the comparison between the basic lateral constraints and the path and displays these constraints only when it detects that one of them is not complied with. The FMS makes the comparison, for example, as the path is being computed or as the flight progresses. When the FMS detects that one of the basic constraints is not complied with, it may also inform the crew thereof via an audible signal.

When the crew has the information according to which a constraint is not complied with, it deals with it, if necessary in relation with the air traffic controller.

The invention claimed is:

1. A method for assisting in verifying the path of an aircraft fitted with a flight management computer assisting the aircraft crew in programming a flight plan formed of a sequence of segments connecting the point of departure to the destination point of the flight plan passing through a succession of waypoints associated with various flight constraints and computing a path that can be flown in compliance with a programmed flight plan based on a navigation database, wherein it consists in verifying, by means of the flight management computer, the compliance with the various lateral flight constraints featuring in the flight plan and in indicating any lapse to the crew.

2. The method for assisting in verifying the path as claimed in claim 1, wherein, when one lateral flight constraint is not complied with, the verification assistance consists in automatically informing the crew, via an audible signal and/or by a display on a man-machine interface, of the lateral flight constraints that are not complied with and of the computed path.

3. The method for assisting in verifying the path as claimed claim 2, wherein that the lateral flight constraints relate to the passenger comfort rules, and/or transitions between segments and/or segment parameters.

4. The method for assisting in verifying the path as claimed in claim 2, wherein the computed path is a reference path computed before the flight or a path that can be flown recomputed during the flight.

5. The flight management computer connected to a navigation interface and capable of computing a path that can be flown based on a flight plan and of displaying this path on the navigation interface, wherein it comprises means of applying the method as claimed in claim 2.

6. The method for assisting in verifying the path as claimed in claim 1, wherein the verification assistance consists in displaying on a man-machine interface the lateral flight constraints and the computed path, at the request of the crew.

7. The method for assisting in verifying the path as claimed claim 6, wherein that the lateral flight constraints relate to the passenger comfort rules, and/or transitions between segments and/or segment parameters.

8. The method for assisting in verifying the path as claimed in claim 6, wherein the computed path is a reference path computed before the flight or a path that can be flown recomputed during the flight.

9. The flight management computer connected to a navigation interface and capable of computing a path that can be flown based on a flight plan and of displaying this path on the navigation interface, wherein it comprises means of applying the method as claimed in claim 6.

10. The method for assisting in verifying the path as claimed in claim 1, wherein that the lateral flight constraints relate to the passenger comfort rules, and/or transitions between segments and/or segment parameters.

11. The method for assisting in verifying the path as claimed in claim 10, wherein the computed path is a reference path computed before the flight or a path that can be flown recomputed during the flight.

12. The flight management computer connected to a navigation interface and capable of computing a path that can be flown based on a flight plan and of displaying this path on the navigation interface, wherein it comprises means of applying the method as claimed in claim 10.

13. The method for assisting in verifying the path as claimed in claim 1, wherein the computed path is a reference path computed before the flight or a path that can be flown recomputed during the flight.

14. The flight management computer connected to a navigation interface and capable of computing a path that can be flown based on a flight plan and of displaying this path on the navigation interface, wherein it comprises means of applying the method as claimed in claim 13.

15. A flight management computer connected to a navigation interface and capable of computing a path that can be flown based on a flight plan and of displaying this path on the navigation interface, wherein it comprises means of applying the method as claimed in claim 1.

* * * * *